(12) United States Patent
Zeiler et al.

(10) Patent No.: US 10,773,198 B2
(45) Date of Patent: *Sep. 15, 2020

(54) SUPPORT AND DRAINAGE MATERIAL, FILTER, AND METHOD OF USE

(71) Applicant: Pall Corporation, Port Washington, NY (US)

(72) Inventors: Martin Zeiler, Schwaebisch Gmuend (DE); John P. Miller, Cortland, NY (US); Thomas M. Sorensen, Freeville, NY (US)

(73) Assignee: PALL CORPORATION, Port Washington, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/169,521

(22) Filed: Oct. 24, 2018

(65) Prior Publication Data

US 2020/0129905 A1    Apr. 30, 2020

(51) Int. Cl.
| | |
|---|---|
| *B01D 27/07* | (2006.01) |
| *B01D 29/07* | (2006.01) |
| *B01D 29/21* | (2006.01) |
| *B01D 46/00* | (2006.01) |
| *B01D 46/52* | (2006.01) |
| *E02D 31/10* | (2006.01) |

(52) U.S. Cl.
CPC ......... *B01D 46/0031* (2013.01); *B01D 29/21* (2013.01); *B01D 46/521* (2013.01); *E02D 31/10* (2013.01)

(58) Field of Classification Search
CPC .. B01D 46/0031; B01D 29/21; B01D 46/521; B01D 46/523; B01D 2201/12; B01D 2201/127; B01D 2275/50; B01D 2265/06; B01D 27/07; B01D 29/07; B01D 29/016; B01D 29/232; B01D 29/333; B01D 29/353; B01D 46/522; B01D 2201/0407; B01D 2201/0415; B01D 2313/14; B01D 2313/143; B01D 2313/146; E02D 31/10
USPC .................. 55/385.1, 521; 210/493.1, 493.5
See application file for complete search history.

(56) References Cited

U.S. PATENT DOCUMENTS

| | | | | |
|---|---|---|---|---|
| 3,198,336 | A * | 8/1965 | Hyslop | B01D 29/21 210/457 |
| 3,280,985 | A * | 10/1966 | Czerwonka | B01D 29/07 210/489 |
| 5,263,792 | A | 11/1993 | Davis et al. | |
| 5,543,047 | A | 8/1996 | Stoyell et al. | |
| 5,552,048 | A * | 9/1996 | Miller | B01D 29/012 210/489 |
| 6,045,597 | A * | 4/2000 | Choi | B01D 29/012 55/483 |

(Continued)

FOREIGN PATENT DOCUMENTS

| | | |
|---|---|---|
| EP | 0 867 216 A1 | 9/1998 |
| EP | 2 380 651 A1 | 10/2011 |

OTHER PUBLICATIONS

European Patent Office, Extended European Search Report in counterpart European Application No. 19201874.5, dated Mar. 6, 2020.

*Primary Examiner* — Minh Chau T Pham
(74) *Attorney, Agent, or Firm* — Leydig, Voit & Mayer, Ltd.

(57) ABSTRACT

Support and drainage materials, filter including the materials, and methods of use are disclosed.

18 Claims, 4 Drawing Sheets

(56) References Cited

U.S. PATENT DOCUMENTS

| | | |
|---|---|---|
| 6,786,013 B2 | 9/2004 | Coulton |
| 10,617,978 B1* | 4/2020 | Miller .................. B01D 46/103 |
| 10,632,402 B1* | 4/2020 | Miller .................... B01D 69/06 |
| 10,639,567 B1* | 5/2020 | Zeiler .................. B01D 46/522 |
| 2002/0083692 A1* | 7/2002 | Richerson .............. B01D 46/10 |
| | | 55/521 |
| 2004/0131423 A1 | 7/2004 | Ianniello et al. |
| 2010/0224554 A1* | 9/2010 | Schindelin ........... B01D 39/083 |
| | | 210/493.5 |
| 2015/0013287 A1* | 1/2015 | Yamaguchi ........ B01D 46/0002 |
| | | 55/491 |
| 2015/0082988 A1* | 3/2015 | Butler ................ B01D 46/0086 |
| | | 96/226 |
| 2018/0200649 A1* | 7/2018 | Nagai .................. B01D 29/213 |
| 2020/0129889 A1* | 4/2020 | Miller .................... B01D 29/07 |
| 2020/0129892 A1* | 4/2020 | Bair ....................... B01D 29/05 |

* cited by examiner

SUPPORT AND DRAINAGE MATERIAL, FILTER, AND METHOD OF USE

BACKGROUND OF THE INVENTION

Support and drainage elements such as meshes (also called screens or netting) are utilized in a number of filtration applications, wherein the support and drainage ("S&D") elements are arranged upstream and/or downstream of porous filter media. The support and drainage elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage material comprising a foldable element comprising at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels.

A support and drainage material according to another embodiment of the invention comprises a foldable element comprising at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; and, wherein, when the foldable element is folded, a portion of the second section fits in the at least one aperture of the at least one first section, providing parallel flow channels.

Typically, embodiments of the support and drainage materials further comprise an additional first section and an additional second section, wherein the additional first section is connected to the second section by a second foldable hinge, and the additional second section is connected to the additional first section by a third foldable hinge.

A support and drainage material system according to an embodiment of the invention comprises a first support and drainage material and a second separate support and drainage material; (a) the first support and drainage material comprising at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels; (b) the second support and drainage material comprising at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and a extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels; wherein the first support and drainage material and the second support and drainage material are suitable for arrangement on opposing sides of a pleated filter having pleat roots and pleat tips.

In accordance with another embodiment, a support and drainage material system comprises a first support and drainage material and a second separate support and drainage material; (a) the first support and drainage material comprising at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; and, wherein, when the foldable element is folded, a portion of the second section fits in the at least one aperture of the at least one first section, providing parallel flow channels; (b) the second support and drainage material comprising at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; and, wherein, when the foldable element is folded, a portion of the second section fits in the at least one aperture of the at least one first section, providing parallel flow channels; wherein the first support and drainage material and the second support and drainage material are suitable for arrangement on opposing sides of a pleated filter having pleat roots and pleat tips.

Filter arrangements, filter systems, and methods of filtering fluid are also provided according to embodiments of the invention.

BRIEF DESCRIPTION OF THE SEVERAL
VIEWS OF THE DRAWING(S)

FIGS. 1A-1C show diagrammatic perspective top views of several embodiments of unfolded support and drainage materials with edge strips, wherein the curved arrows show the folding pattern if the filter media is underneath. FIG. 1A illustrates a staggered arrangement of parallel flow channels and apertures in a single section; FIG. 1B illustrates two sections with parallel flow channels followed by two sections with apertures, and FIG. 1C illustrates sections with apertures alternating with sections with parallel flow channels.

FIG. 2A illustrates a diagrammatic top view of the support and drainage material shown in FIG. 1A, wherein the material is partially folded, and FIG. 2B shows a right side view of the material along the sectional view shown in FIG. 2A.

FIGS. 3A-3C show various views of an embodiment of a support and drainage system comprising first and second support and drainage materials shown in FIG. 2A, with a pleated filter between the first and second support and drainage materials, as well as an embodiment of a filter system comprising a pleated filter between first and second support and drainage materials. FIG. 3A shows an orthogonal view; FIG. 3B shows a front view; and FIG. 3C shows an enlarged view of the detail J as shown in FIG. 3B.

FIGS. 4A-4C show various views of the support and drainage system and the filter system shown in FIGS. 3A-3C, wherein the support and drainage materials are fully folded, and the edge strips have been removed. FIG. 4A shows an orthogonal view; FIG. 4B shows a front view; and FIG. 4C shows an enlarged view of the detail as shown in FIG. 4B.

FIGS. 5A-5C show various views of the support and drainage system and the filter system shown in FIGS. 3A-3C, wherein the support and drainage materials are fully folded, and the edge strips have been removed, wherein the pleated filter has a laid-over-pleat (LOP) configuration.

DETAILED DESCRIPTION OF THE
INVENTION

In accordance with an embodiment of the present invention, a support and drainage material is provided comprising a foldable element comprising at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels.

A support and drainage material according to another embodiment of the invention comprises a foldable element comprising at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; and, wherein, when the foldable element is folded, a portion of the second section fits in the at least one aperture of the at least one first section, providing parallel flow channels.

Typically, embodiments of the support and drainage material further comprise a plurality of additional first sections and a plurality of additional second sections (preferably providing a continuous sheet along the length of the filter), wherein the additional first section is connected to the second section by a second foldable hinge, and the additional second section is connected to the additional first section by a third foldable hinge (and so on). Illustratively, when the foldable element is folded, a portion of the additional first section fits in the at least one aperture of the at least one additional second section, and a portion of the additional second section fits in the at least one aperture of the at least one additional first section, providing parallel flow channels; or, in another embodiment, wherein, when the foldable element is folded, a portion of the additional second section fits in the at least one aperture of the at least one additional first section, providing parallel flow channels.

A support and drainage material system according to an embodiment of the invention comprises a first support and drainage material and a second separate support and drainage material; (a) the first support and drainage material comprising at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels; (b) the second support and drainage material comprising at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and a extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels; wherein the first support and drainage material and the second support and drainage material are suitable for arrangement on opposing sides of a pleated filter having pleat roots and pleat tips.

In accordance with another embodiment, a support and drainage material system comprises a first support and drainage material and a second separate support and drainage material; (a) the first support and drainage material comprising at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; and, wherein, when the foldable element is folded, a portion of the second section fits in the at least one aperture of the at least one first section, providing parallel flow channels; (b) the second support and drainage material comprising at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge; and, wherein, when the foldable element is folded, a portion of the second section fits in the at least one aperture of the at least one first section, providing parallel flow channels; wherein the first support and drainage material and the second support and drainage material are suitable for arrangement on opposing sides of a pleated filter having pleat roots and pleat tips.

Filter arrangements, filter systems, and methods of filtering fluid are also provided according to embodiments of the invention.

A filter arrangement according to an embodiment of the invention comprises a pleated porous filter having a plurality of pleats and having an upstream surface and a downstream surface; and, an embodiment of the support and drainage material, arranged to contact the upstream surface of the pleated porous filter, or to contact the downstream surface of the pleated porous filter.

In another embodiment, a filter system is provided, comprising a pleated porous filter having a plurality of pleats and having an upstream surface and a downstream surface; and, an embodiment of the support and drainage material system, wherein the pleated porous filter is arranged between the first support and drainage material and the second support and drainage material.

An embodiment of a method of filtering fluid is also provided, the method comprising passing a fluid through an embodiment of the filter system, including passing fluid through the first support and drainage material, the upstream surface of the pleated porous filter, the downstream surface of the pleated porous filter, and the second support and drainage material.

Advantageously, the support and drainage materials, when placed between layers of filter media (pleated or non-pleated), provide support and uniform spacing (including reducing or preventing nesting wherein strands of mesh on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss.

Support and drainage materials can be produced with reduced thicknesses and can be designed to better match flow conditions. When used with a pleated filter, they can reduce filter media (especially membrane) damage and allow more uniform flow distribution (including flow through the pleated tip of the filter), and provide a stable pleat-pack. Additionally, in contrast with conventional pleated filters having two layers or sheets of sheet of support and drainage material between individual pleats, when used with a pleated filter, a single layer or sheet of support and drainage material can be used, reducing waste, and allowing more filter material to be used (and in some applications allowing an overall thinner pleat pitch and more filter material in a given volume), while maintaining a desirable pressure differential, and improving filtration efficiency. Additionally, support and drainage materials including hinges are compatible with conventional pleating devices.

Illustratively, the at least one first aperture can extend a length of about 75% to about 100% a distance between the first end and the second end and/or the at least one second aperture can extend a length of about 75% to about 100% a distance between the first end and the second end. In an embodiment of the support and drainage material, the at least one first section has two or more first section apertures and/or the at least one second section has two or more second section apertures. In another embodiment, the at least one first section has at least two first section apertures, each extending a length of about 2% to about 50% a distance between the first side and the second side; and/or the at least one second section has at least two single second section apertures, each extending a length of about 2% to about 50% a distance between the first side and the second side. Individual apertures, within a section and/or in different sections, can have different widths. Illustratively, at least one first section aperture and/or at least one second section aperture can extend a length of about 2% to about 50% a distance between the first side and the second side, and at least one second first section aperture and/or at least one second section second aperture can extend a length of about 2% to about 46% a distance between the first side and the second side.

The support and drainage material can be flat or planar, or substantially flat or planar, and in some embodiments, the support and drainage material is or can be curved.

Embodiments of the invention are suitable for use with a variety of filter configurations, including flat pleat filter packs, direct flow spiral filters, stacked disk filters, crossflow cassettes, and are particularly suitable for "laid-over-pleat" (LOP) filter configurations (as described in, for example, U.S. Pat. No. 5,543,047).

Each of the components of the invention will now be described in more detail below, wherein like components have like reference numbers. Where upstream and downstream S&D materials are each illustrated with the same components, the corresponding components are identified with similar reference numbers, followed by "'", e.g., 100' corresponds to 100; 100A' corresponds to 100A; 200' corresponds to 200; 200A' corresponds to 200A; 1000' corresponds to 1000, etc.

Figure 1A:
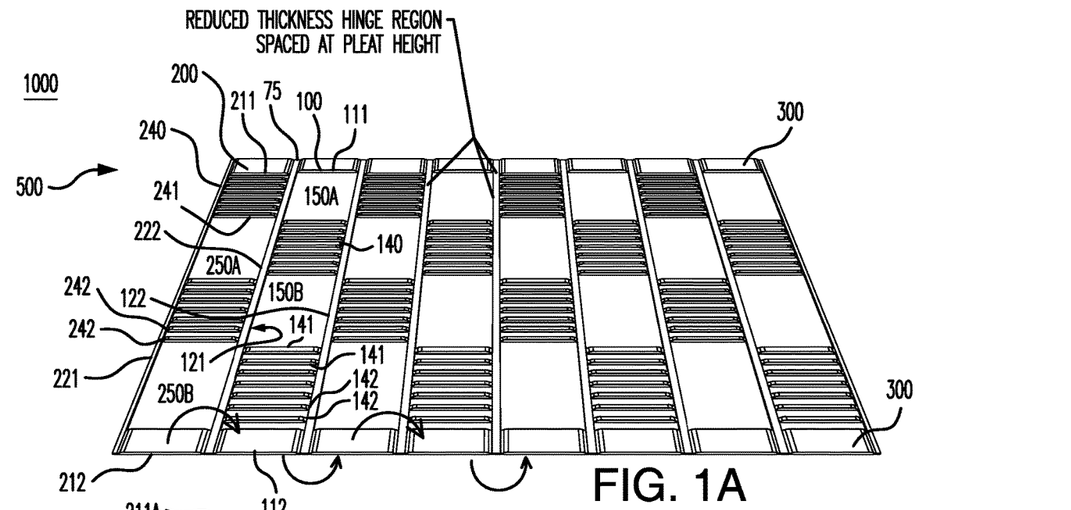
Figure 1B:
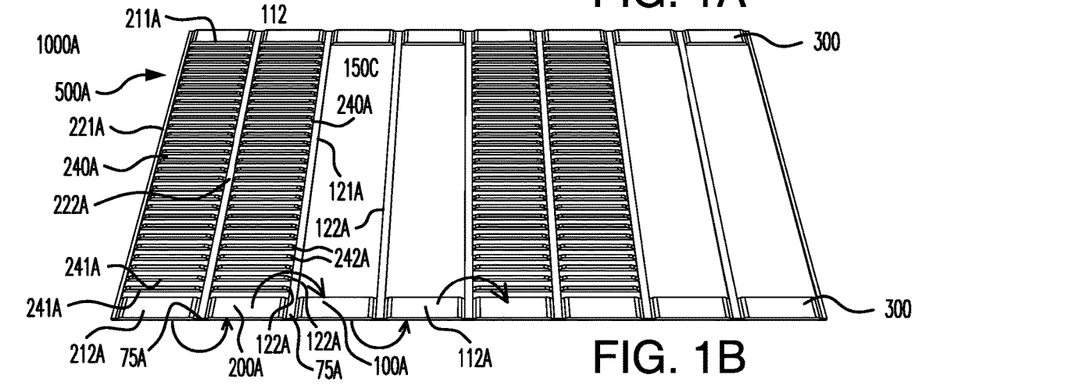
Figure 1C:
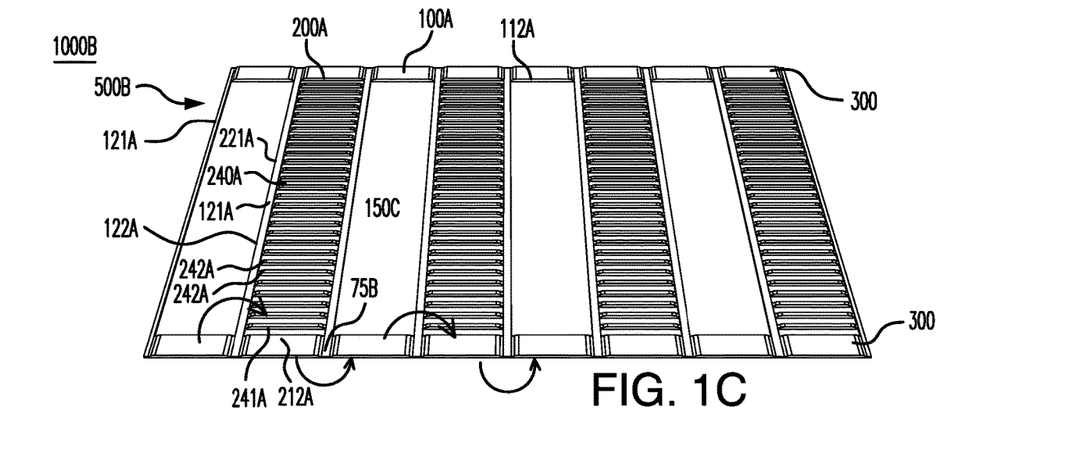

FIG. 1 illustrates diagrammatic perspective top views of several embodiments of unfolded support and drainage materials with edge strips, wherein FIG. 1A illustrates a staggered arrangement of parallel flow channels and apertures in a single section (also showing the folding pattern); FIG. 1B illustrates two sections with parallel flow channels followed by two sections with apertures, and FIG. 1C illustrates sections with apertures alternating with sections with parallel flow channels.

In accordance with the embodiment illustrated in FIG. 1A, a support and drainage material 1000 comprises a foldable element 500 comprising at least one first section 100 having a first end 121 and a second end 122, a first side 111 and a second side 112, a first major surface 101 and a second major surface 102, and a plurality of parallel flow channels 140 extending from the first end to the second end, the flow channels comprising side walls 141 arranged in parallel and projecting upwardly from, and perpendicular to, the first major surface, the side walls having top walls 142; and, at least one second section 200 having a first end 221 and a second end 222, a first side 211 and a second side 212, a first major surface 201 and a second major surface 202, and a plurality of parallel flow channels 240 extending from the first end to the second end, the flow channels comprising side walls 241 arranged in parallel and projecting upwardly from, and perpendicular to, the first major surface, the side walls having top walls 242; wherein the first section is connected to the second section by a flexible hinge 75; wherein, the at least one first section further comprises at least one first section aperture 150 (illustrated as 2 apertures 150A, 150B) extending a length of at least about 75% a distance between the first end and the second end, and extending a length of about 2% to about 100% a distance between the first side and the second side, and/or the at least one second section further comprises at least one second section aperture 250 (illustrated as 2 apertures 250A, 250B) extending a length of at least about 75% a distance between the first end and the second end, and extending a length of about 2% to about 100% a distance between the first side and the second side; wherein, when the foldable element is folded, a portion of the first section fits in the at least one aperture of the at least one second section, and/or a portion of the second section fits in the at least one aperture of the at least one first section, providing parallel flow channels.

In another embodiment, as illustrated in FIG. 1B, a support and drainage material 1000A comprises a foldable element 500A comprising at least one first section 100A having a first end 121A and a second end 122A, a first side 111A and a second side 112A, a first major surface 101A and a second major surface 102A; and, at least one second section 200A having a first end 221A and a second end 222A, a first side 211A and a second side 212A, a first major surface 201A and a second major surface 202A, and a plurality of parallel flow channels 240A extending from the first end to the second end, the flow channels comprising side walls 241A arranged in parallel and projecting upwardly from, and perpendicular to, the first major surface, the side walls having top walls 242A; wherein the first section is connected to the second section by a flexible hinge 75A; wherein, the at least one first section further comprises at least one first section aperture 150 (illustrated as aperture 150C) extending a length of about 2% to about 100% a distance between the first end and the second end, and extending a length of about 2% to about 100% a distance between the first side and the second side; wherein, when the foldable element is folded, a portion of the second section fits in the at least one aperture of the at least one first section, providing parallel flow channels.

In another embodiment, as illustrated in FIG. 1C, a support and drainage material 1000B comprises a foldable element 500B comprising at least one first section 100A having a first end 121A and a second end 122A, a first side 111A and a second side 112A, a first major surface 101A and a second major surface 102A, and at least one first section aperture 150 (illustrated as aperture 150C) extending a length of at least about 75% a distance between the first end and the second end, and extending a length of about 2% to about 100% a distance between the first side and the second side; and, at least one second section 200A having a first end 221A and a second end 222A, a first side 211A and a second side 212A, a first major surface 201A and a second major surface 202A, and a plurality of parallel flow channels 240A extending from the first end to the second end, the flow channels comprising side walls 241A arranged in parallel and projecting upwardly from, and perpendicular to, the first major surface, the side walls having top walls 242A; wherein the first section is connected to the second section by a flexible hinge 75B; and, wherein, when the foldable element is folded, a portion of the second section fits in the at least one aperture of the at least one first section, providing parallel flow channels.

As will be described in more detail below (e.g., with respect to FIGS. 3C and 4C), when support and drainage materials are arranged upstream and downstream of a pleated filter, one support and drainage material has an inner hinge (typically having a reduced (e.g., half) thickness to essentially maintain a single layer thickness when folded) contacting and supporting the pleat root, and the other support and drainage material has an outer hinge (optionally having a reduced thickness) contacting and protecting the pleat tip, the hinges allowing fluid flow therethrough. Thus, for example, FIG. 1A shows hinges 75 connecting each section, the hinges could all have the same reduced thickness, or reduced thickness hinges could alternate with non-reduced thickness hinges.

Figures 2A, 2B, 3A, 3B, 3C:
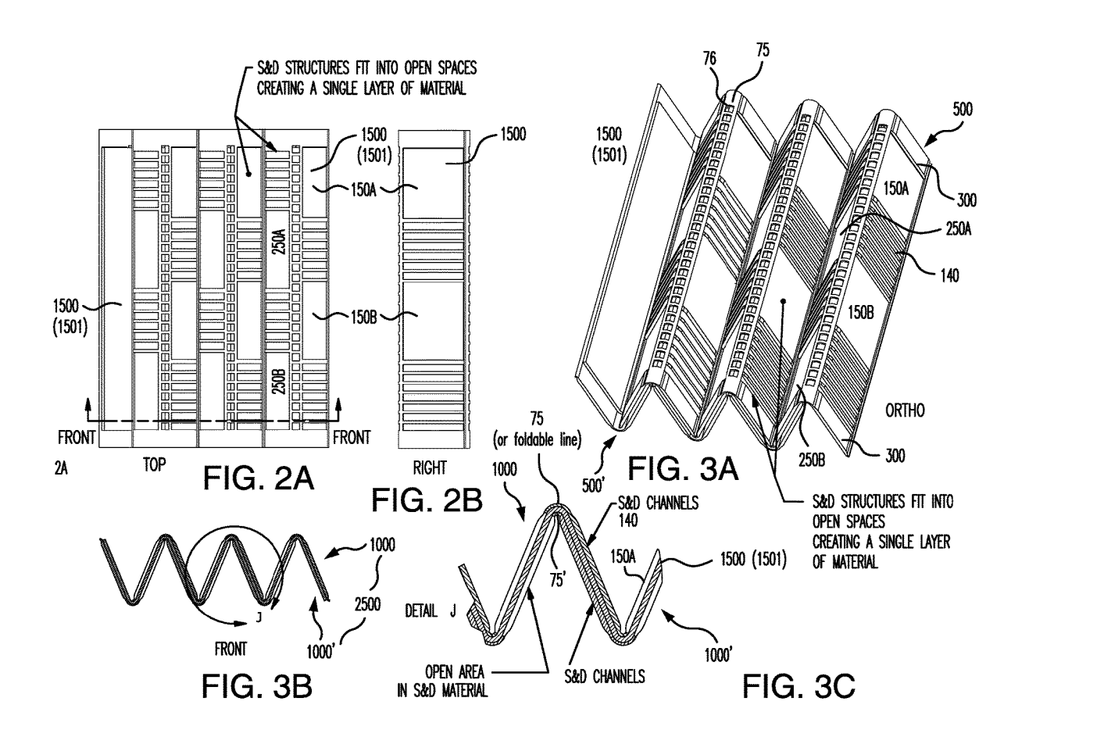
Figure 5A:
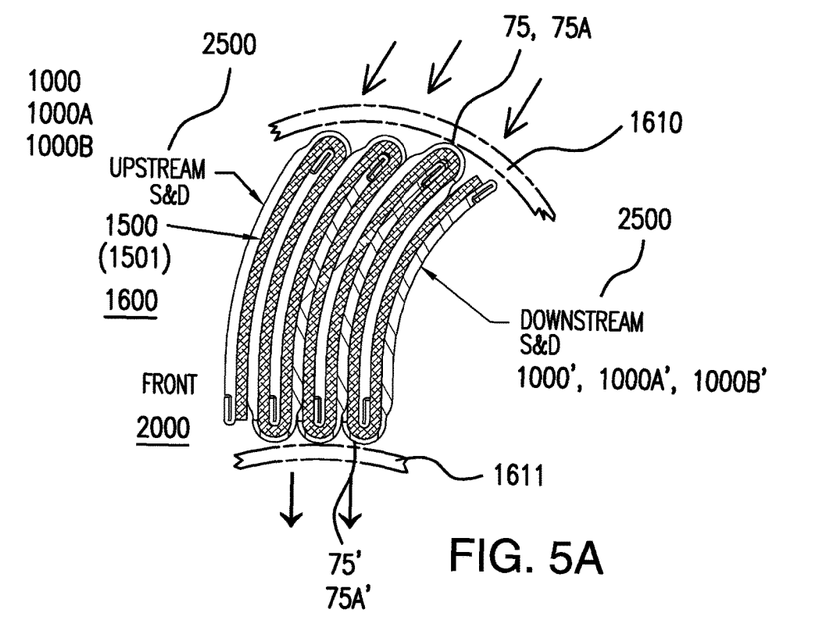
FIG. 5A shows a front view of a pleated filter illustrated as a filter cartridge.
Figure 5B:
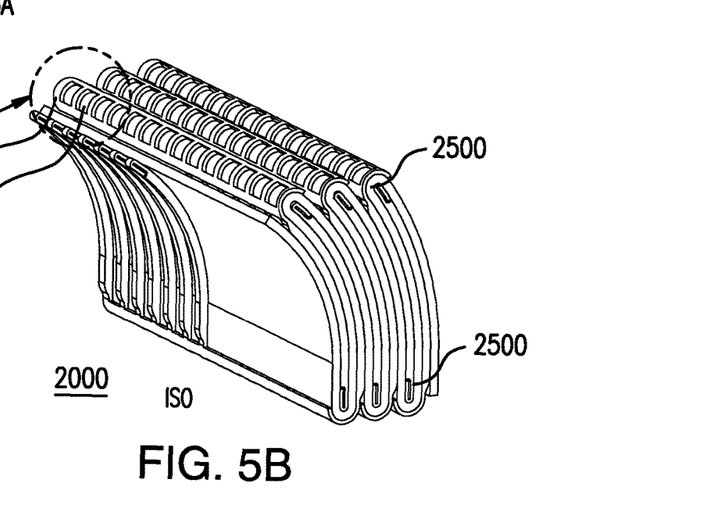
FIG. 5B shows an isometric view of the support and drainage system and the filter system.
Figure 5C:
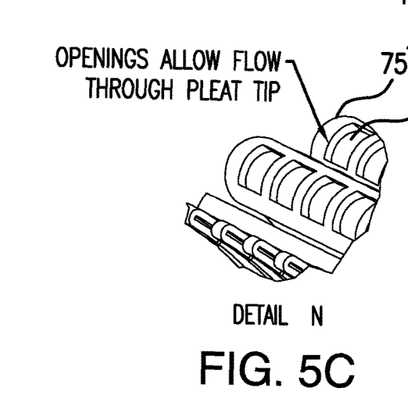
FIG. 5C shows an enlarged view of the detail N as shown in FIG. 5B.

The hinges include openings to allow fluid flow therethough, as shown in FIGS. 3A, 5B, and 5C, showing hinges 75 with openings 76. While these Figures show the hinges associated with the pleat tip, the hinges associated with the pleat roots can have the same or similar configuration.

While the embodiments illustrated in FIGS. 1B and 1C have some similar structures, the arrangement of sections differs, i.e., FIG. 1B illustrates two sections with parallel flow channels followed by two sections with apertures, and FIG. 1C illustrates sections with apertures alternating with sections with parallel flow channels. When arranged upstream and/or downstream of a pleated filter, the embodiments are folded differently with respect to adjoining pleats of the filter.

The embodiments illustrated in FIGS. 1A-1C include edge strips 300 that are typically removed in assembling the filter system (comprising S&D materials upstream and downstream of the pleated porous filter). Thus, when referring to the lengths of distances between the first side and the second side of various apertures, the measurement refers to the portion of the first or second section contacting the edge of the edge strip where the strip is to be cut/removed.

FIG. 2A illustrates a diagrammatic top view of the support and drainage material 1000 shown in FIG. 1A, wherein the material is partially folded and is arranged upstream of a porous pleated filter 1500 comprising a pleated filter element 1501, and FIG. 2B shows a right side view of the folded material and filter along the sectional view shown in FIG. 2A. As will be discussed with respect to FIGS. 3A-3C, downstream support and drainage material 1000', while present, is not seen in FIGS. 2A and 2B.

FIG. 3 shows various views of an embodiment of a support and drainage system 2500 comprising first and second support and drainage materials 1000 and 1000' present in FIG. 2A, with a pleated filter 1500 between the first and second support and drainage materials, as well as an embodiment of a filter system 2000 comprising the pleated filter between first and second support and drainage materials. FIG. 3A shows an orthogonal view, FIG. 3B shows a front view, and FIG. 3C shows an enlarged view of the detail J as shown in FIG. 3B. When the support and drainage materials are fully folded, the parallel flow channels fit into the corresponding apertures, in effect, providing a single layer of support and drainage material.

Figures 4A, 4B, 4C:
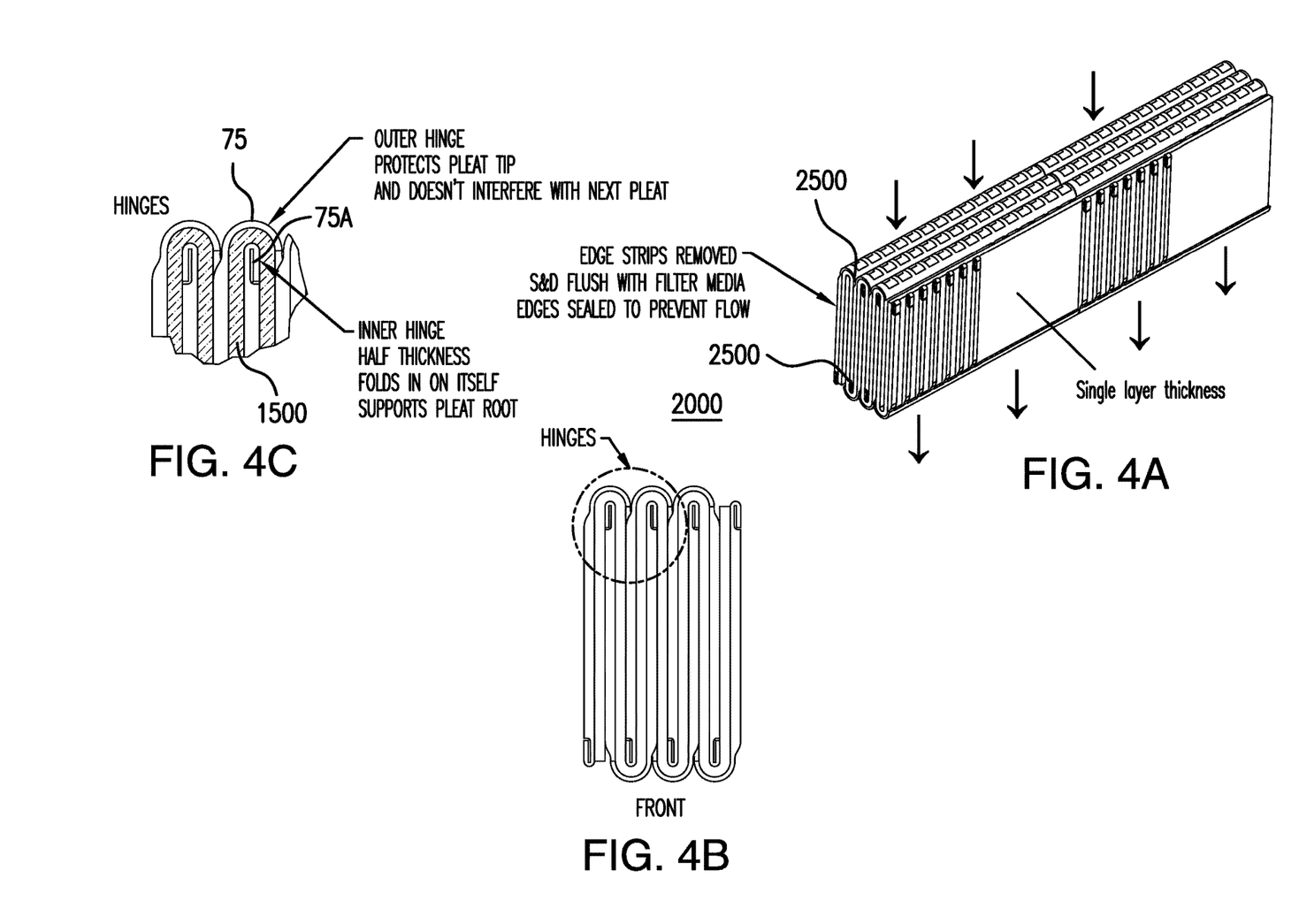

FIG. 4 shows various views of the support and drainage system and the filter system shown in FIGS. 3A-3C, wherein the support and drainage materials are fully folded, and the edge strips have been removed, such that the remaining sides of the support and drainage material are flush with the sides of the filter media, and sealed together to prevent flow. The parallel flow channels fit into the apertures. FIG. 4A shows an orthogonal view (with arrows showing the fluid flow), FIG. 4B shows a front view, and FIG. 4C shows an enlarged view of the detail as shown in FIG. 4B, the detail view also showing outer hinges protecting the pleat tips of the pleated filter, and the inner hinges folding in on themselves and supporting the pleat roots of the pleated filter, wherein the reduced thickness of the inner hinge essentially maintain a single layer thickness when folded.

Embodiments with curved or curvable support and drainage materials are particularly suitable for laid-over-pleat (LOP) filter configurations. For example, FIG. 5 various views of the support and drainage system and the filter system shown in FIGS. 3A-3C (equally applicable utilizing the embodiments of the S&D material illustrated in FIGS. 1B and 1C), wherein the support and drainage materials are fully folded, and the edge strips have been removed, such that the remaining sides of the support and drainage material are flush with the sides of the filter media, and sealed together to prevent flow, wherein the pleated filter has a LOP configuration.

In particular, the sectional front view in FIG. 5A shows an embodiment of a filter system 2000 comprising filter cartridge 1600 comprising an outer filter cage 1610, an inner core 1611, and a LOP filter 1500 comprising a pleated filter medium 1501, wherein embodiments of individual support and drainage materials 1000, 1000', 1000A, 1000A', 1000B, and 1000B' as shown in FIGS. 1A-1C (providing an embodiment of a S&D element system 2500) are arranged upstream and downstream of the filter, spacing the pleat tip or pleat root away from the cage or core, thus protecting the pleat tip or pleat root, while allowing fluid flow therethrough. With reference to the arrows showing fluid flow, fluid passes through the upstream S&D material, the upstream and downstream surfaces of the filter, and through the downstream S&D material.

FIG. 5B shows an isometric view of the support and drainage system and the filter system, and FIG. 5C shows an enlarged view of the detail N as shown in FIG. 5B, the detail view also openings 76 through the hinges 75 allowing fluid flow through the pleat tips.

The support and drainage materials can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

A porous filter and/or a porous filter element (e.g., a porous membrane and/or a porous fibrous medium) can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The porous filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter and/or filter element can have a variety of configurations, including planar, pleated and/or hollow cylindrical.

Exemplary filters and filter elements, including pleated filters, are disclosed in U.S. Pat. Nos. 5,543,047 and 5,552,048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support and drainage material comprising a foldable element comprising:
    at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and,
    at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge;
    wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and extending a length of about 2% to about 100% a distance between the first side and the second side;
    wherein, when the foldable element is folded, a portion of the first section fits in the at least one aperture of the at least one second section, and/or a portion of the second section fits in the at least one aperture of the at least one first section, providing parallel flow channels.

2. A support and drainage material comprising a foldable element comprising:
    at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and,
    at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls;
    wherein the first section is connected to the second section by a flexible hinge; and,
    wherein, when the foldable element is folded, a portion of the second section fits in the at least one aperture of the at least one first section, providing parallel flow channels.

3. The support and drainage material of claim 1, further comprising an additional first section and an additional second section, wherein the additional first section is connected to the second section by a second foldable hinge, and the additional second section is connected to the additional first section by a third foldable hinge;
    wherein, when the foldable element is folded, a portion of the additional first section fits in the at least one aperture of the at least one additional second section, and a portion of the additional second section fits in the at least one aperture of the at least one additional first section, providing parallel flow channels.

4. The support and drainage material of claim 2, further comprising an additional first section and an additional second section, wherein the additional first section is connected to the second section by a second foldable hinge, and the additional second section is connected to the additional first section by a third foldable hinge;
    wherein, when the foldable element is folded, a portion of the additional second section fits in the at least one aperture of the at least one additional first section, providing parallel flow channels.

5. The support and drainage material of claim 1, wherein the at least one first section has at least two first section apertures, each extending a length of about 2% to about 50% a distance between the first side and the second side; and/or
    the at least one second section has at least two single second section apertures, each extending a length of about 2% to about 50% a distance between the first side and the second side.

6. A support and drainage material system comprising a first support and drainage material and a second separate support and drainage material;
    (a) the first support and drainage material comprising:
        at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and,
        at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge;
        wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and extending a length of about 2% to about 100% a distance between the first side and the second side;

wherein, when the foldable element is folded, a portion of the first section fits in the at least one aperture of the at least one second section, and/or a portion of the second section fits in the at least one aperture of the at least one first section, providing parallel flow channels;

(b) the second support and drainage material comprising:

at least one first section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls; wherein the first section is connected to the second section by a flexible hinge;

wherein, the at least one first section further comprises at least one first section aperture extending a length of at least about 75% a distance between the first end and the second end, and extending a length of about 2% to about 100% a distance between the first side and the second side, and/or the at least one second section further comprises at least one second section aperture extending a length of at least about 75% a distance between the first end and the second end, and a extending a length of about 2% to about 100% a distance between the first side and the second side;

wherein, when the foldable element is folded, a portion of the first section fits in the at least one aperture of the at least one second section, and/or a portion of the second section fits in the at least one aperture of the at least one first section, providing parallel flow channels wherein the first support and drainage material and the second support and drainage material are suitable for arrangement on opposing sides of a pleated filter having pleat roots and pleat tips.

7. A support and drainage material system comprising a first support and drainage material and a second separate support and drainage material;

(a) the first support and drainage material comprising:

at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls;

wherein the first section is connected to the second section by a flexible hinge; and, wherein, when the foldable element is folded, a portion of the second section fits in the at least one aperture of the at least one first section, providing parallel flow channels;

(b) the second support and drainage material comprising:

at least one first section having a first end and a second end, a first side and a second side, a first major surface and a second major surface, and at least one first section aperture extending a length of at least about 75% a distance between the first end and the second end, and extending a length of about 2% to about 100% a distance between the first side and the second side; and, at least one second section having a first end and a second end, a first side and a second side, a first major surface and a second major surface, and a plurality of parallel flow channels extending from the first end to the second end, the flow channels comprising side walls arranged in parallel and projecting upwardly from, and perpendicular to, the first major surface, the side walls having top walls;

wherein the first section is connected to the second section by a flexible hinge; and, wherein, when the foldable element is folded, a portion of the second section fits in the at least one aperture of the at least one first section, providing parallel flow channels;

wherein the first support and drainage material and the second support and drainage material are suitable for arrangement on opposing sides of a pleated filter having pleat roots and pleat tips.

8. A filter arrangement comprising:

a pleated porous filter having a plurality of pleats and having an upstream surface and a downstream surface; and the support and drainage material of claim 1, arranged to contact the upstream surface of the pleated porous filter, or to contact the downstream surface of the pleated porous filter.

9. A filter system comprising:

a pleated porous filter having a plurality of pleats and having an upstream surface and a downstream surface; and the support and drainage material system of claim 6, wherein the pleated porous filter is arranged between the first support and drainage material and the second support and drainage material.

10. A filter system comprising:

a pleated porous filter having a plurality of pleats and having an upstream surface and a downstream surface; and the support and drainage material system of claim 7, wherein the pleated porous filter is arranged between the first support and drainage material and the second support and drainage material.

11. The filter system of claim 9, wherein the pleated porous filter comprises a laid-over-pleat filter.

12. The filter system of claim 10, further comprising an inner core and an outer cage.

13. The filter system of claim 9, wherein the apertures are relatively uniformly spaced between the pleat roots and the pleat tips.

14. A method of filtering fluid, the method comprising passing a fluid through the filter system of claim 9, including passing fluid through the first support and drainage material, the upstream surface of the pleated porous filter, the downstream surface of the pleated porous filter, and the second support and drainage material.

15. A filter arrangement comprising:
    a pleated porous filter having a plurality of pleats and having an upstream surface and a downstream surface; and
    the support and drainage material of claim 2, arranged to contact the upstream surface of the pleated porous filter, or to contact the downstream surface of the pleated porous filter.

16. A filter arrangement comprising:
    a pleated porous filter having a plurality of pleats and having an upstream surface and a downstream surface; and
    the support and drainage material of claim 3, arranged to contact the upstream surface of the pleated porous filter, or to contact the downstream surface of the pleated porous filter.

17. A filter arrangement comprising:
    a pleated porous filter having a plurality of pleats and having an upstream surface and a downstream surface; and
    the support and drainage material of claim 4, arranged to contact the upstream surface of the pleated porous filter, or to contact the downstream surface of the pleated porous filter.

18. The support and drainage material of claim 3, wherein the at least one first section has at least two first section apertures, each extending a length of about 2% to about 50% a distance between the first side and the second side; and/or
    the at least one second section has at least two single second section apertures, each extending a length of about 2% to about 50% a distance between the first side and the second side.

\* \* \* \* \*